(12) United States Patent
Ohsugi

(10) Patent No.: US 8,702,241 B2
(45) Date of Patent: Apr. 22, 2014

(54) LIGHT SOURCE DEVICE AND PROJECTOR

(75) Inventor: Naohiro Ohsugi, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 131 days.

(21) Appl. No.: 13/529,764

(22) Filed: Jun. 21, 2012

(65) Prior Publication Data

US 2012/0327377 A1    Dec. 27, 2012

(30) Foreign Application Priority Data

Jun. 24, 2011  (JP) .................. 2011-140478

(51) Int. Cl.
| | |
|---|---|
| *G03B 21/14* | (2006.01) |
| *G03B 21/26* | (2006.01) |
| *F21V 1/00* | (2006.01) |
| *F21V 11/00* | (2006.01) |
| *F21V 21/00* | (2006.01) |
| *F21S 4/00* | (2006.01) |
| *F21V 17/12* | (2006.01) |
| *G03B 21/00* | (2006.01) |
| *H04N 9/31* | (2006.01) |
| *G03B 21/20* | (2006.01) |

(52) U.S. Cl.
CPC .............. *G03B 21/208* (2013.01); *H04N 9/317* (2013.01); *F21V 17/12* (2013.01)
USPC .............. 353/38; 353/94; 353/100; 362/240; 362/249.01

(58) Field of Classification Search
CPC .............. G03B 21/00; G03B 21/2013; G03B 21/2033; G03B 21/208; G03B 3/0006; G03B 3/0037; G03B 3/005; G03B 3/0056; G03B 6/003; G03B 6/0068; G03B 6/0073; G03B 19/0047; G03B 19/0052; G03B 19/0057; G03B 19/0061; G03B 19/0066; F21K 9/30; F21V 17/12; F21Y 2101/02; H04N 9/3141; H04N 9/315; H04N 9/3161; H04N 9/3164; H04N 9/317
USPC ............... 353/31, 38, 94, 100–102; 362/227, 362/230–231, 235–237, 240, 362/249.01–249.02, 612–613, 800
See application file for complete search history.

(56) References Cited

U.S. PATENT DOCUMENTS

| | | | | |
|---|---|---|---|---|
| 5,722,760 | A | * | 3/1998 | Chien .............................. 362/84 |
| 7,303,291 | B2 | * | 12/2007 | Ikeda et al. .................... 353/102 |

(Continued)

FOREIGN PATENT DOCUMENTS

| | | |
|---|---|---|
| JP | 2002-049326 A | 2/2002 |
| JP | 2006-331817 A | 12/2006 |

(Continued)

*Primary Examiner* — Tony Ko
*Assistant Examiner* — Jori S Reilly-Diakun
(74) *Attorney, Agent, or Firm* — Holtz, Holtz, Goodman & Chick, PC

(57) ABSTRACT

A light source device is provided which includes a light source holding member in which light source elements are arranged, a lens array which has a plurality of lens portions which are arranged so as to correspond to the light source elements, respectively, and formed integrally with a plate-like base portion, and an array holding member for holding the lens array, wherein the lens array has hole portions through which fixing screw members are inserted, wherein the array holding member has threaded hole portions in positions which correspond to the hole portions, and wherein the fixing screw members pass through the hole portions in the lens array and are then brought into engagement with the threaded hole portions in the array holding member to thereby allow the lens array and the array holding member to be disposed to adhere to each other.

16 Claims, 11 Drawing Sheets

(56) References Cited

U.S. PATENT DOCUMENTS

| | | | |
|---|---|---|---|
| 7,682,853 B2 * | 3/2010 | Ashida | 438/28 |
| 7,736,019 B2 * | 6/2010 | Shimada et al. | 362/244 |
| 8,348,461 B2 | 1/2013 | Wilcox et al. | |
| 2006/0238720 A1 * | 10/2006 | Lee et al. | 353/38 |
| 2007/0121085 A1 * | 5/2007 | Dewald | 353/99 |
| 2008/0273327 A1 * | 11/2008 | Wilcox et al. | 362/267 |
| 2008/0298056 A1 * | 12/2008 | Petersen | 362/235 |
| 2009/0298376 A1 * | 12/2009 | Guillien et al. | 445/43 |

FOREIGN PATENT DOCUMENTS

| | | |
|---|---|---|
| JP | 2008-145510 A | 6/2008 |
| JP | 2011-048220 A | 3/2011 |
| WO | WO 2011/053349 A1 | 5/2011 |

* cited by examiner

LIGHT SOURCE DEVICE AND PROJECTOR

CROSS-REFERENCE TO RELATED APPLICATIONS

This application is based upon and claims the benefit of priority under 35 USC 119 of Japanese Patent Application No. 2011-140478 filed on Jun. 24, 2011, the contents of which are incorporated herein by reference.

BACKGROUND OF THE INVENTION

1. Field of the Invention

The present invention relates to a light source device and a projector.

2. Description of the Related Art

In these days, data projectors are used on many occasions as image projection units which project images including images of screens of personal computers and video images, as well as images based on image data which is stored in memory cards and the like on to a screen. In these projectors, light emitted from a light source is collected on to a micro-mirror display element called a digital micromirror device (DMD) or a liquid crystal panel for projection of color images on to a screen.

Conventionally, the mainstream of these projectors has been those which utilize a high-intensity discharge lamp as a light source. In recent years, however, there have been made many developments on data projectors which use, as a light source, a light emitting diode, a laser diode, an organic EL device or a luminescent material.

For example, a light source device is known which has a plurality of light emitting elements which are arranged into a matrix on a flat plane, collimator lenses which collect light emitted from the light emitting elements and a holding member which holds them. In this light source device, optical axes of these collimator lenses need to be adjusted individually with high accuracy.

For example, Japanese Unexamined Patent Application No. 2002-49326 (JP-A-2002-49326) describes a light source device which uses a single lens array in place of a plurality of collimator lenses. This light source device has a plurality of light emitting elements which are provided to scatter on a flat plane and a lens array which is an optical element which is disposed so as to face light emitted from the light emitting elements, and light passes through the lens array and is emitted at right angles to the flat plane.

However, in a configuration like that of the light source device described above in which highly bright light emitted from light source elements such as light emitting elements is designed to be emitted via a lens array, when the lens array is disposed close to the light emitting elements, the lens array is also heated to a high temperature together with the light emitting elements, resulting in fears that such a drawback is caused that the lens array is deformed due to heat, for example.

In addition, in a light source device having a simple construction in which a lens array is fixed to an array holding member made of a metallic material along a circumference thereof in order to enhance the heat dissipation performance in such away that both end portions of the lens array are in engagement with both end portions of the array holding member, when the lens array is heated to such a high temperature that the lens array is deformed, the adhesion of the lens array to the array holding member is reduced, resulting in a possibility that the heat dissipation performance is reduced.

BRIEF SUMMARY OF THE INVENTION

According to a first aspect of the invention, there is provided a light source device comprising:
   a light source holding member in which a plurality of light source elements are arranged into a matrix at predetermined intervals;
   a lens array, disposed on a light shining side of the light source elements, which has (a) a plate-like base portion and (b) a plurality of lens portions which are (i) arranged into a matrix fashion at predetermined intervals so as to correspond to the light source elements, respectively, and (ii) formed integrally with the plate-like base portion; and
   an array holding member which is disposed between the light source holding member and the lens array to hold the lens array, wherein
   the lens array has a plurality of first hole portions, through which first fixing screw members are inserted, in the plate-like base portion thereof, wherein
   the array holding member has a plurality of first threaded hole portions with which the first fixing screw members are brought into engagement in positions which correspond individually to the first hole portions in the lens array, and wherein
   the first fixing screw members pass through the first hole portions in the lens array and are then brought into engagement with the first threaded hole portions in the array holding member to thereby allow the lens array and the array holding member to be disposed to adhere to each other.

In addition, according to a second aspect of the invention, there is provided a projector comprising a light source device, a display element which forms an optical image with light emitted by the light source device, a projection-side optical system which projects the optical image formed by the display element on to a screen, and a projector control unit which controls the light source device and the display element, wherein
   the light source device is the light source device set forth in the first aspect of the invention.

Advantages of the invention will be set forth in a detailed description of the invention below or will be apparent in part from the description. Alternatively, the advantages may be learned through practice of the invention. The advantages of the invention may be realized or obtained by instrumentalities or combinations thereof which will be described in the following description.

BRIEF DESCRIPTION OF THE DRAWINGS

The accompanying drawings, which are incorporated in and constitute part of the specification, illustrate an embodiment of the invention and serve to explain the principles of the invention together with the general description given above and the detailed description of the embodiment given below.

DETAILED DESCRIPTION OF THE PREFERRED EMBODIMENT

A mode for carrying out the invention will be described by reference to the drawings.

Figure 1:
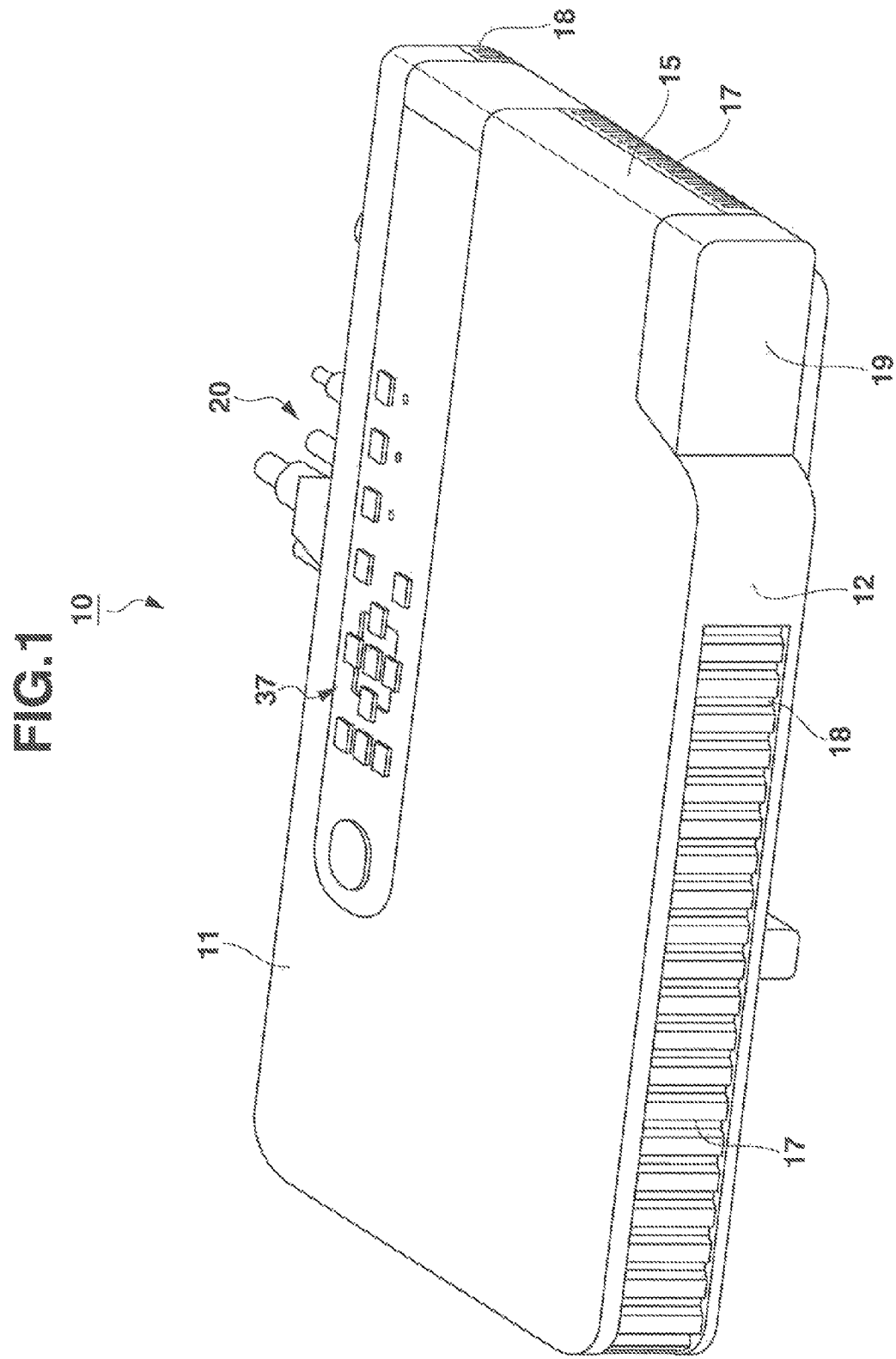
FIG. 1 is a perspective view showing an external appearance of a projector according to an embodiment of the invention.

Hereinafter, an embodiment of the invention will be described. FIG. 1 is a perspective view showing an external appearance of a projector 10. In this embodiment, left and right with respect to the projector 10 denote, respectively, left and right directions with respect to a projecting direction, and front and rear denote, respectively, front and rear directions with respect to a direction towards a screen and a traveling direction of a pencil of light which is emitted from the projector 10 towards the screen.

As is shown in FIG. 1, the projector 10 has a substantially rectangular parallelepiped shape. The projector 10 has a lens cover 19 which covers a projection opening which is laid to a side of a front side panel 12 which is referred to as a front panel of a projector casing. Additionally, pluralities of outside air inlet ports 18 and inside air outlet ports 17 are formed in the front side panel 12. Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display element, a control circuit or the like overheats.

Further, provided on a back side or a back side panel of the projector casing are an input/output connector unit where USB terminals, an image signal input D-SUB terminal, an S terminal, an RCA terminal and the like are provided and various types of terminals 20 including a power supply adaptor plug. Additionally, a plurality of outside air inlet ports are formed in the back side panel. In addition, pluralities of inside air outlet ports 17 are formed in a right-hand side panel which is a lateral side panel of the projector casing which is not shown and a left-hand side panel 15 which is a lateral side panel shown in FIG. 1. Further, an outside air inlet port 18 is also formed in a position on the left-hand side panel 15 which lies near a corner portion formed by the left-hand side panel 15 and the back side panel.

Figure 2:
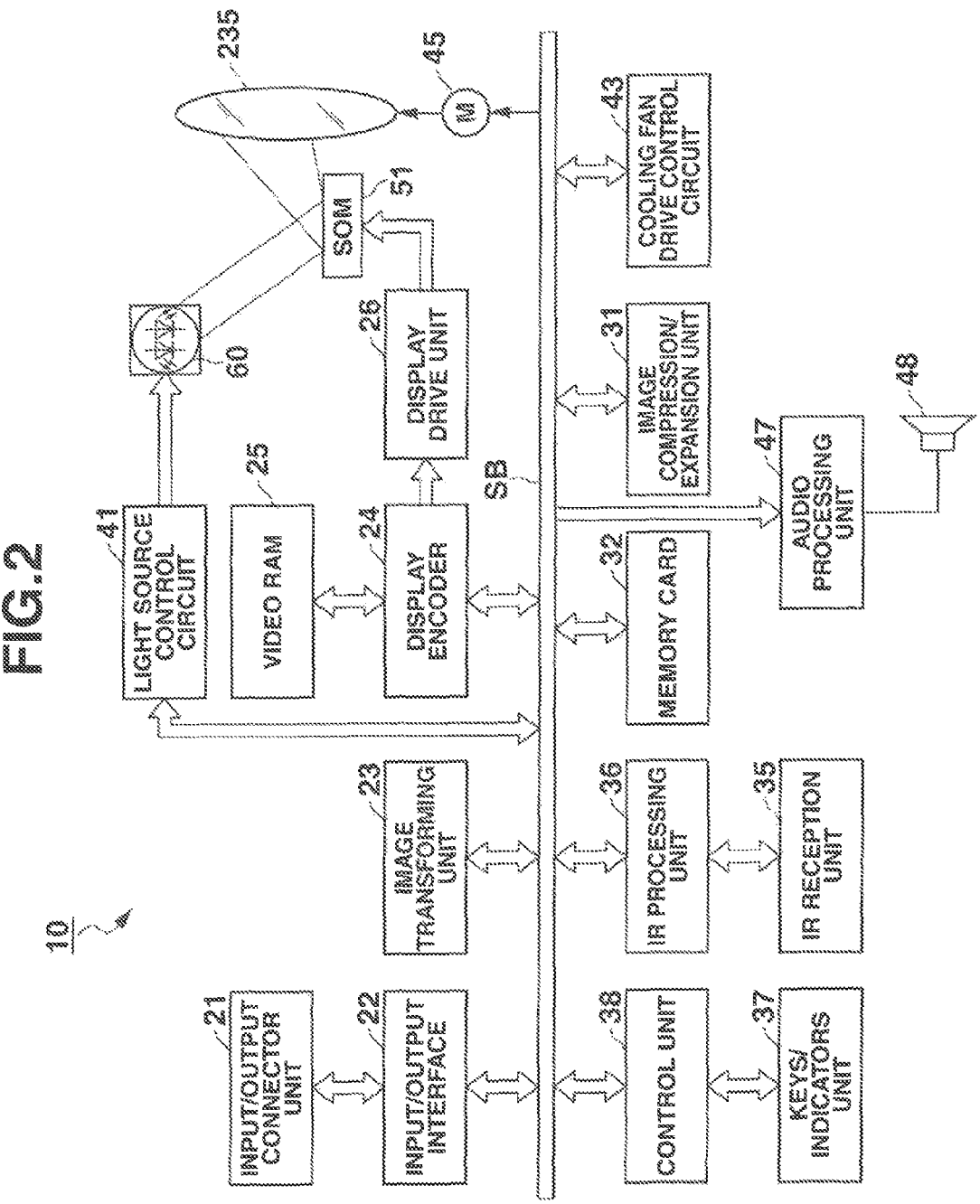
FIG. 2 is a functional block diagram of the projector according to the embodiment of the invention.

Next, a projector control unit of the projector 10 will be described by use of a functional block diagram shown in FIG. 2. The projector control unit includes a control unit 38, an input/output interface 22, an image transforming unit 23, a display encoder 24, a display drive unit 26 and the like. Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display element control unit and drives a display element 51 which is a spatial optical modulator (SOM) at an appropriate frame rate in response to the image signal outputted from the display encoder 24. In this projector 10, a pencil of light which is emitted from a light source unit 60 is shone onto the display element 51 via a light guiding optical system to thereby form an optical image based on reflected light reflected by the display element 51. The image so formed is then projected on to a screen, not shown, for display thereon via a projection side optical system, which will be described later. In addition, a movable lens group 235 of the projection side optical system is driven by a lens motor 45 for zooming or focusing.

An image compression/expansion unit 31 performs a recording operation in which a luminance signal and a color difference signal of an image signal are data compressed through ADCT and Huffman coding operations, and the compressed data is sequentially written on a memory card 32 which is configured as a detachable recording medium. Further, when in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

The control unit 38 governs the control of respective operations of circuitries within the projector 10 and is made up of a CPU, a ROM which stores in a fixed fashion operation programs of various types of settings and a RAM which is used as a work memory.

Operation signals generated at the keys/indicators unit 37 which is made up of the main keys and indicators provided on the upper side panel 11 of the projector casing are sent out directly to the control unit 38. Key operation signals from the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control unit 38 controls a light source control circuit 41 which is configured as a light source control unit. This light source control circuit 41 controls individually the emission of light of an excitation light shining device, a red light source device and a blue light source device of the light source unit 60 so that light of a predetermined wavelength band which is required when an image is generated is emitted from the light source unit 60.

Further, the control unit 38 causes a cooling fan drive control circuit 43 to detect temperatures through a plurality of temperature sensors which are provided in the light source unit 60 or the like so as to control the rotating speed of a cooling fan based on the results of the temperature detection. Additionally, the control unit 38 also causes the cooling fan drive control circuit 43 to make the cooling fan continue to rotate even after the power supply of a projector main body is switched off by use of a timer or the like. Alternatively, the control unit 38 causes the cooling fan drive control circuit 43 to make the power supply to the projector main body be cut off depending upon the results of the temperature detection by the temperature sensors.

Figure 3:
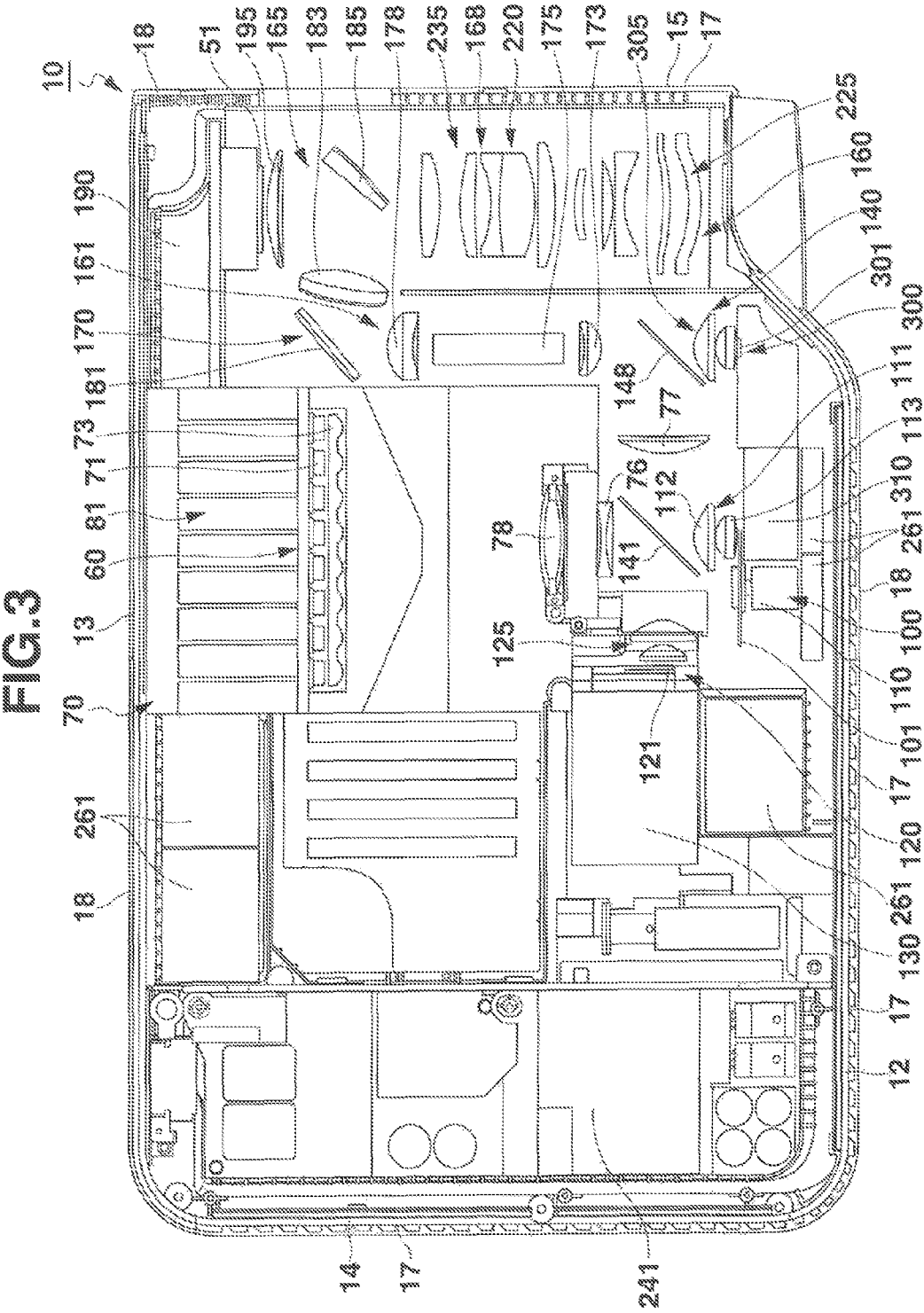
FIG. 3 is an exemplary plan view showing an internal construction of the projector according to the embodiment of the invention.

Next, an internal construction of the projector 10 will be described. FIG. 3 is an exemplary plan view showing an internal construction of the projector 10. As shown in FIG. 3, the projector 10 includes a control circuit board 241 in the vicinity of the right side panel 14. This control circuit board 241 includes a power supply circuit block, a light source control block and the like. Additionally, the projector 10 includes the light source unit 60 which is provided to a side of the control circuit board 241, that is, at a substantially central portion of the projector casing. Further, the projector 10 includes an optical system unit 160 between the light source unit 60 and the left-hand side panel 15.

The light source unit 60 includes an excitation light shining device 70, a luminescent light emitting device 100, a blue light source device 300, a red light source device 120 and a light guiding optical system 140. The excitation light shining device 70 is disposed at a substantially transversely central portion of the projector casing and in proximity to the back side panel 13. The luminescent light emitting device 100 is disposed on the axis of a pencil of light which is emitted from the excitation light shining device 70 and in proximity to the front side panel 12. The blue light source device 300 is disposed in proximity to the front side panel 12 so as to be parallel to a pencil of light which is emitted from the luminescent light emitting device 100. The red light source device 120 is disposed between the excitation light shining device 70 and the luminescent light emitting device 100. The light guiding optical system 140 turns the directions of optical axes of light emitted from the luminescent light emitting device 100, light emitted from the red light source device 120 and light emitted from the blue light source device 300 so that the optical axes of the light of different colors emitted from the luminescent light emitting device 100 and the light source devices 120, 300 are collected to the same optical axis so as to be guided to a predetermined plane or an entrance port of a light tunnel 175.

The excitation light shining device 70 includes a plurality of excitation light sources 71 functioning as light source elements which are disposed so that optical axes thereof are at right angles to the backside panel 13, a collective lens 78 which collects light emitted from the excitation light sources 71, and a heat sink 81 which is disposed between the excitation light sources 71 and the back side panel 13. In the excitation light shining device 70 of this embodiment, the plurality of excitation light sources 71 which shine light of a predetermined wavelength band are arranged into a matrix fashion so as to make up a surface light source member.

To describe the excitation light shining device in detail, the excitation light sources 71 of the light source device are arranged into a matrix of a total of 24 blue laser diodes which are arranged in three rows and eight columns. A lens array 73 is disposed to be situated on optical axes of the blue laser diodes. The lens array 73 is a collective lens which transforms light emitted from the blue laser diodes into parallel light. The lens array 73 according to the embodiment has a plurality of convex lens portions which cause light rays emitted from the individual excitation light sources 71 which function as light source elements to be incident on the collective lens 78.

A cooling fan 261 is disposed in proximity to the heat sink 81, and the excitation light sources 71 are cooled by the cooling fan 261 and the heat sink 81.

The luminescent light emitting device 100 includes a luminescent wheel 101, a wheel motor 110 which rotationally drives the luminescent wheel 101 and a group of collective lenses 111 which collects pencils of luminescent light emitted from the luminescent wheel 101 in the direction of the back side panel 13. The luminescent wheel 101 functions as a luminescent plate which is disposed so as to be parallel to the front side panel 12, that is, so as to be at right angles to an optical axis of a pencil of light emitted from the excitation light shining device 70 via a concave lens 76. The group of collective lenses 111 has a large-diameter convex lens 112 and a small-diameter convex lens 113, which are disposed in a straight line so that respective optical axes of the convex lenses coincide with an optical axis of the collective lens 78.

The luminescent wheel 101 is a circular disk-shaped metal base. An annular luminescent light emitting area is formed on the luminescent wheel 101 as a depressed portion. This annular luminescent light emitting area receives light emitted from the excitation light sources 71 as excitation light and emits luminescent light of green wavelength band. Thus, the luminescent wheel 101 functions as a luminescent plate which receives excitation light to emit luminescent light. In addition, a surface of a side of the luminescent wheel 101 which faces the excitation light sources 71 and includes the luminescent light emitting area is mirror finished through silver deposition, whereby a reflection plane which reflects light is formed on the surface. A layer of a green luminescent material is laid to be in abutment with this reflection plane.

Then, light emitted from the excitation light sources 71 and shone on to the green luminescent material layer on the luminescent wheel 101 via the lens array 73, the collective lens 78, the concave lens 76 and a first dichroic mirror 141 excites the green luminescent material in the green luminescent material layer. Pencils of luminescent light are emitted in every direction from the green luminescent material so excited and are then directed directly towards the excitation light sources 71 or are reflected on a reflection plane of the luminescent wheel 101 so as to be eventually directed towards the excitation light sources 71. In addition, excitation light which passes through the luminescent material layer to be shone on to the metal base without being absorbed by the luminescent material in the luminescent material layer is reflected by the reflection plane to enter the luminescent material layer again, whereby the luminescent material is excited. Thus, by making the surface of the depressed portion on the luminescent wheel 101 into the reflection plane, the efficiency of utilization of excitation light emitted from the excitation light sources 71 can be enhanced, so that brighter luminescent light can be emitted from the luminescent wheel 101. The concave lens 76 transforms excitation light from the excitation light sources 71 into substantially parallel light.

In excitation light which is reflected on the reflection plane of the luminescent wheel 101 towards the luminescent material layer, excitation light which is emitted towards the excitation light sources 71 without being absorbed by the luminescent material passes through the first dichroic mirror 141, which will be described later, and luminescent light is reflected by the first dichroic mirror 141. Therefore, excitation light is emitted to the outside of the projector 10 in no case. Then, a cooling fan 261 is disposed between the wheel motor 110 and the front side panel 12, and the luminescent wheel 101 is cooled by this cooling fan 261.

The red light source device 120 includes a red light source 121 and a group of collective lenses 125 which collects light emitted from the red light source 121. This red light source 121 is disposed so that an optical axis thereof is at right angles to the optical axes of the excitation light sources 71. The red light source device 120 is disposed so that the optical axis thereof intersects the optical axis of light emitted from the excitation light shining device 70 and the optical axis of luminescent light of green wavelength band which is emitted from the luminescent wheel 101. The red light source 121 is a red light emitting diode which is a semiconductor light emitting element which emits light of red wavelength band. Further, the red light source device 120 includes a heat sink 130 which is disposed on a side of the red light source 121 which faces the right-hand side panel 14. In addition, a cooling fan 261 is disposed between the heat sink 130 and the front side panel 12, and the red light source 121 is cooled by this cooling fan 261.

The blue light source device 300 includes a blue light source 301 and a group of collective lenses 305 which collects light emitted from the blue light source 301. The blue light source 301 is disposed so that an optical axis thereof is parallel to the optical axis of light emitted from the luminescent light emitting device 100. The blue light source device 300 is disposed so that the optical axis of light emitted therefrom intersects the optical axis of light emitted from the red light source device 120. The blue light source 301 is a blue light emitting diode which is a semiconductor light emitting element which emits light of blue wavelength band. Further, the blue light source device 300 includes a heat sink 310 which is disposed on a side of the blue light source 301 which faces the front side panel 12. A cooling fan 261 is disposed between the heat sink 310 and the front side panel 12, and the blue light source 301 is cooled by this cooling fan 261.

The light guiding optical system 140 includes collective lenses which collect pencils of light of red, green and blue wavelength bands and dichroic mirrors which turn the directions of optical axes of the pencils of light of red, green and blue wavelength bands to direct them to the same optical axis. Specifically speaking, in the light guiding optical system 140, the first dichroic mirror 141 is disposed in a position where the optical axes of light of blue wavelength band emitted from the excitation light shining device 70 and light of green wavelength band emitted from the luminescent wheel 101 intersect the optical axis of light of red wavelength band emitted from the red light source device 120. This first dichroic mirror 141 transmits light of blue and red wavelength bands and reflects light of green wavelength band to turn the direction of the optical axis of the green light by 90 degrees towards the left-hand side panel 15.

In addition, in the light guiding optical system 140, a second dichroic mirror 148 is disposed in a position where the optical axis of light of blue wavelength band emitted from the blue light source device 300 intersects the optical axis of light of red wavelength band emitted from the red light source device 120. This second dichroic mirror 148 transmits light of blue wavelength band and reflects light of green and red wavelength bands to turn the direction of the optical axis of the green light and the red light by 90 degrees towards the back side panel 13. Additionally, a collective lens 77 is disposed between the first dichroic mirror 141 and the second dichroic mirror 148. Further, a collective lens 173 is disposed in proximity to the light tunnel 175. This collective lens 173 collects light source light to the entrance port of the light tunnel 175.

The optical system unit 160 is configured into a substantially U-shape by three blocks such as an illumination side block 161 which is positioned to a left-hand side of the excitation light shining device 70, an image generating block 165 which is positioned in proximity to a position where the back side panel 13 intersects the left-hand side panel 15, and a projection side block 168 which is positioned between the light guiding optical system 140 and the left-hand side panel 15.

The illumination side block 161 includes part of a light source side optical system 170 which guides light source light emitted from the light source unit 60 to the display element 51 that is possessed by the image generating block 165. Included as the light source side optical system 170 that the illumination side block 161 possesses are the light tunnel 175 which transforms a pencil of light emitted from the light source unit 60 into a pencil of light in which the intensity thereof is uniformly distributed, a collective lens 178 which collects light emitted from the light tunnel 175, and an optical axis turning mirror 181 which turns the direction of the optical axis of a pencil of light emitted from the light tunnel 175 towards the image generating block 165.

The image generating block 165 has, as the light source side optical system 170, a collective lens 183 which collects the light source light which is reflected on the optical axis turning mirror 181 to the display element 51 and a shining mirror 185 which shines the pencil of light which passes through the collective lens 183 to the display element 51 at a predetermined angle. Further, the image generating block 165 includes a DMD which is the display element 51. A heat sink 190 is disposed between the display element 51 and the back side panel 13 for cooling the display element 51. Thus, the display element 51 is cooled by this heat sink 190. Additionally, a collective lens 195, which constitutes part of a projection side optical system 220, is disposed in proximity to the front of the display element 51.

The projection side block 168 has a group of lenses of the projection side optical system 220 which projects the "on" light which is reflected on the display element 51 on to the screen. This projection side optical system 220 includes a group of fixed lenses 225 which is incorporated in a fixed lens barrel and a group of movable lenses 235 which is incorporated in a movable lens barrel. These groups of lenses are configured as a variable focus lens having a zooming function, and the group of movable lenses 235 is moved by a lens motor for zooming and focusing.

Figure 4:
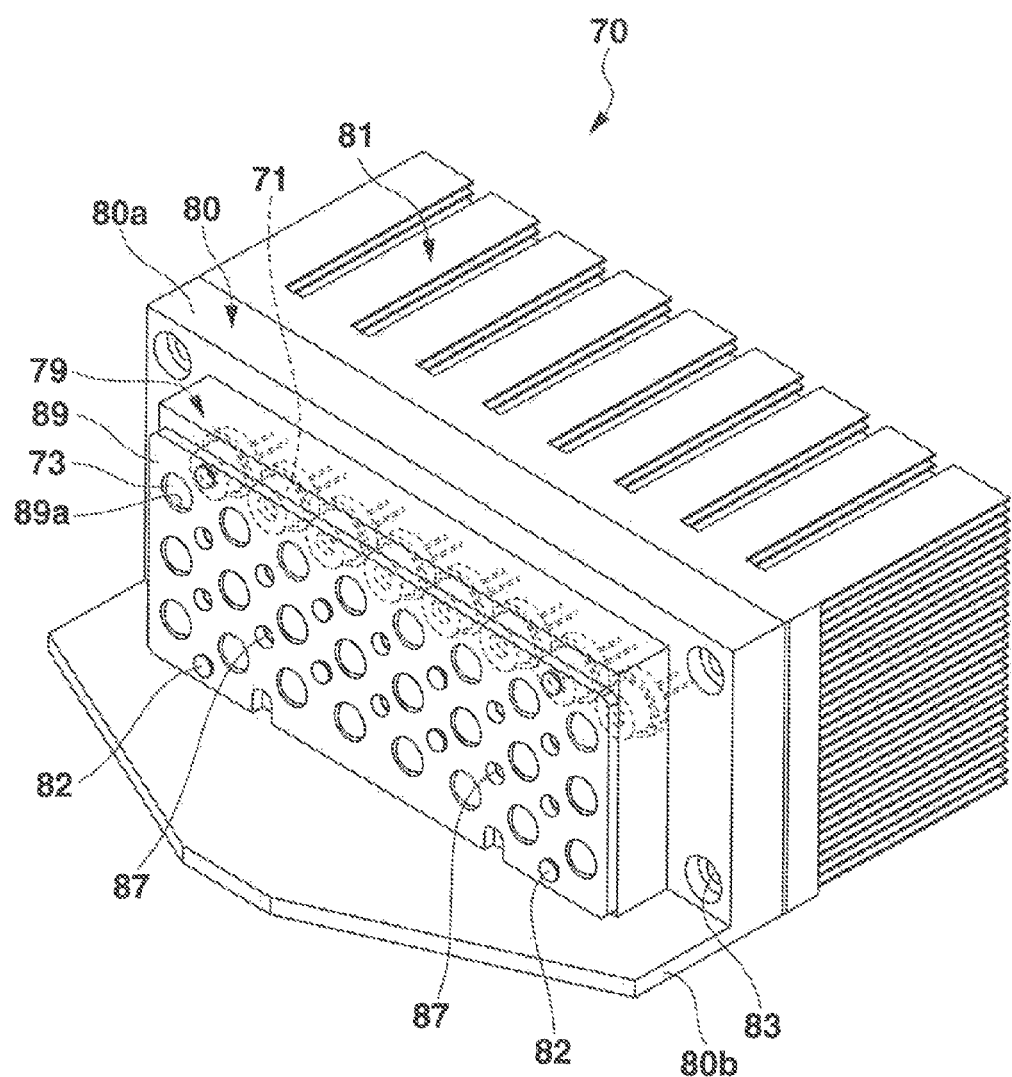
FIG. 4 is a perspective view of a light source device according to the embodiment of the invention.
Figure 5:
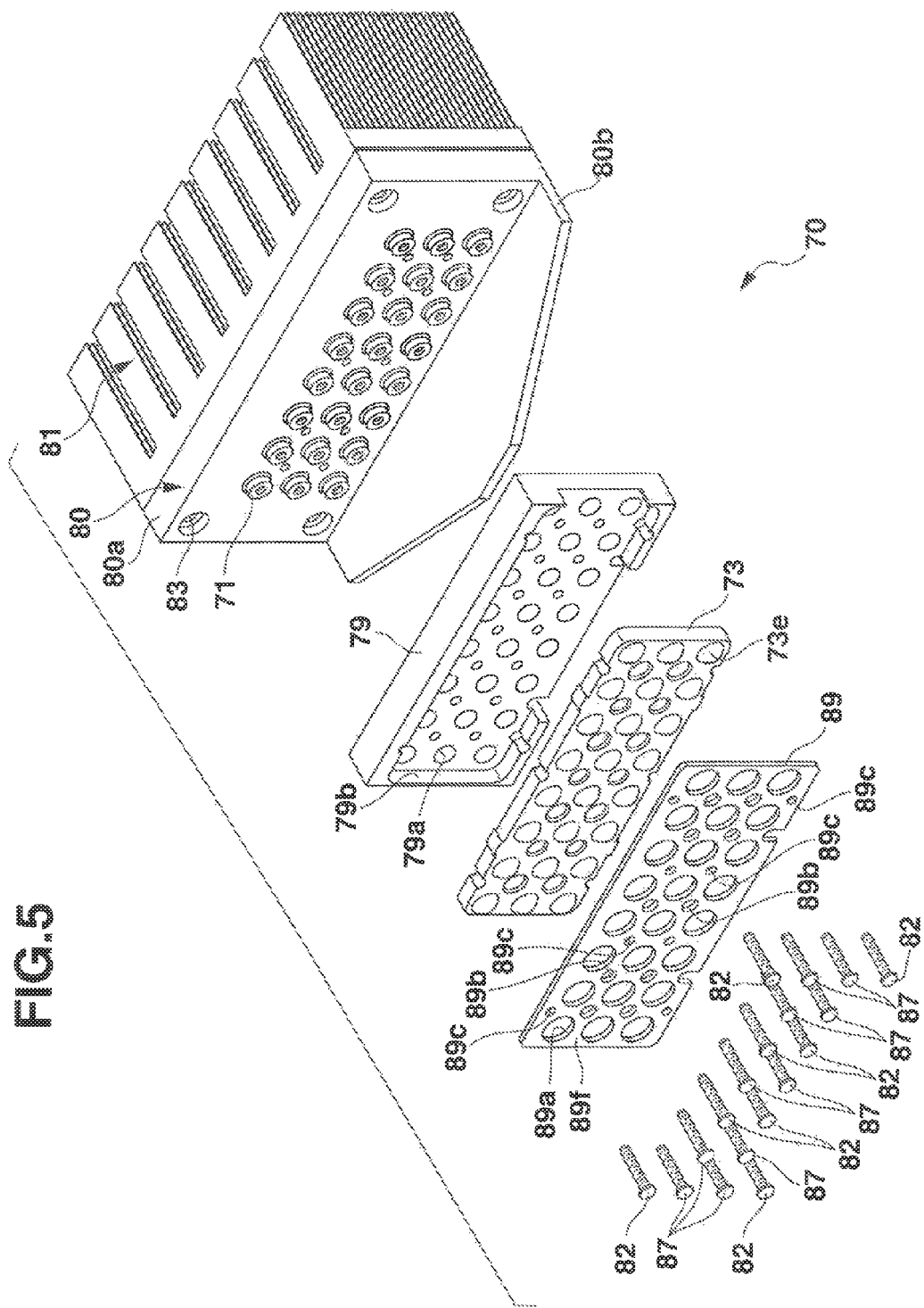
FIG. 5 is an exploded perspective view of the light source device according to the embodiment of the invention.
Figure 6:
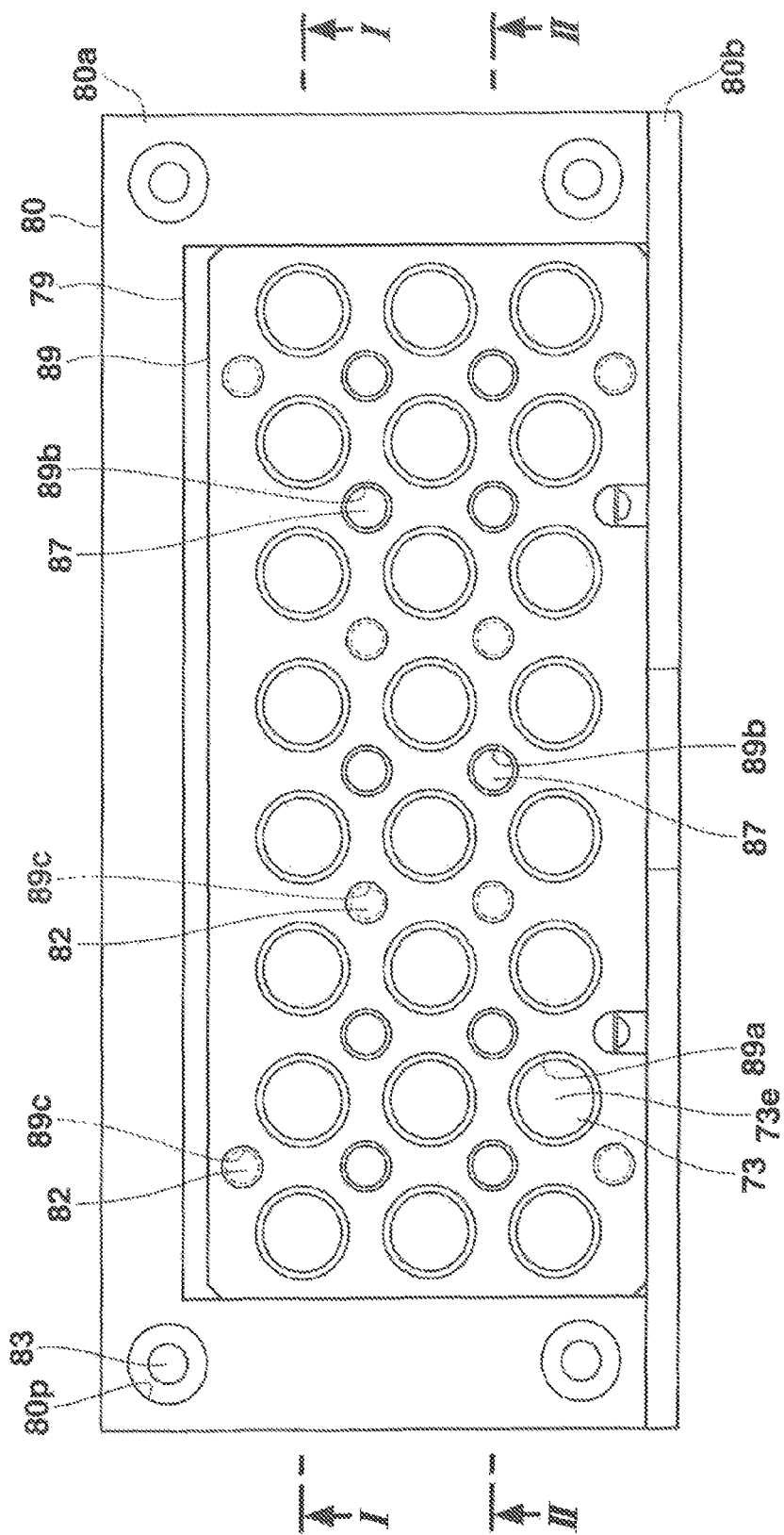
FIG. 6 is a front view of the light source device according to the embodiment of the invention.
Figure 7:
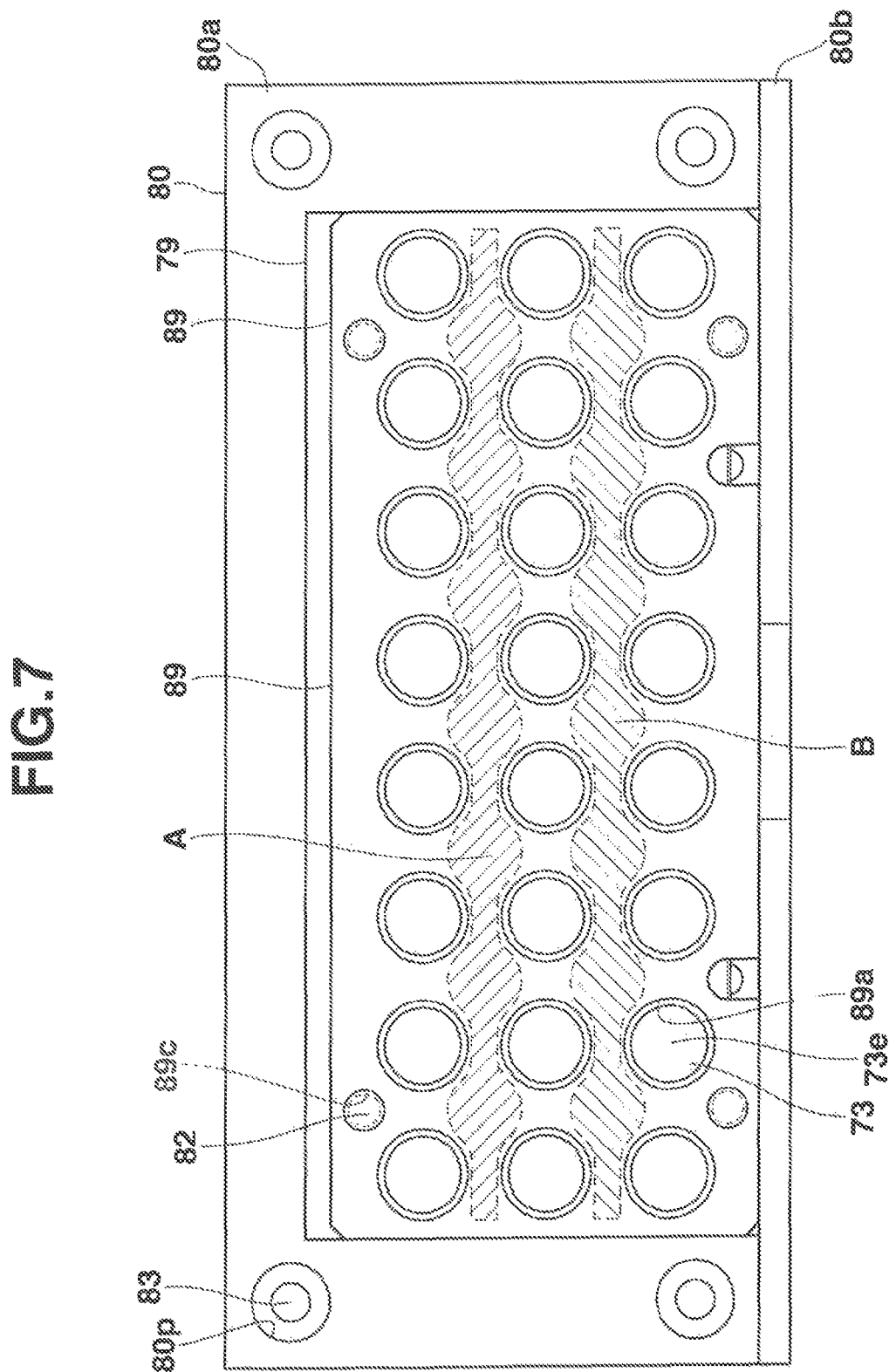
FIG. 7 is an explanatory drawing of a screw disposition area of the light source device according to the embodiment of the invention.
Figure 8:
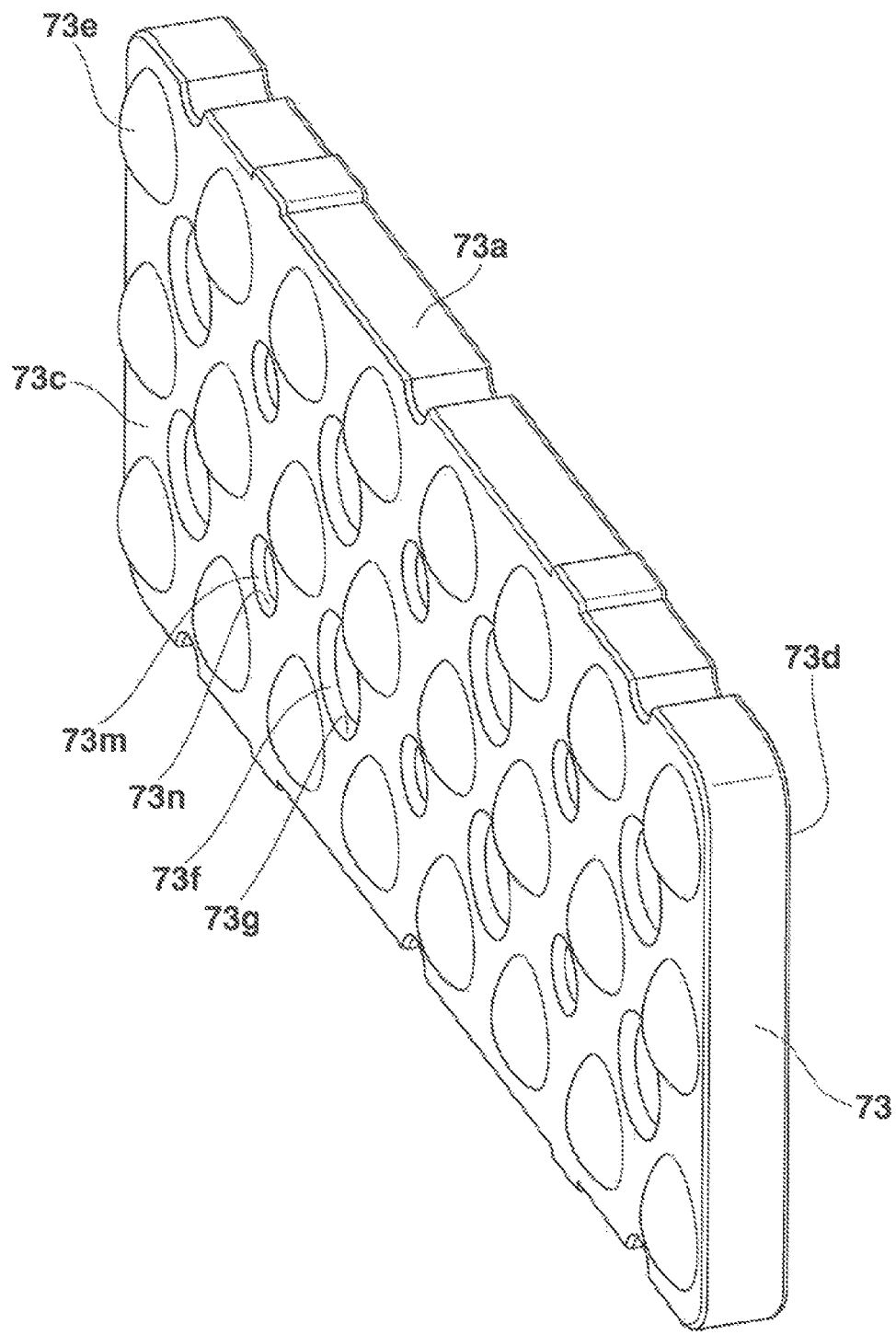
FIG. 8 is a perspective view of a lens array of the light source device according to the embodiment of the invention.
Figure 9:
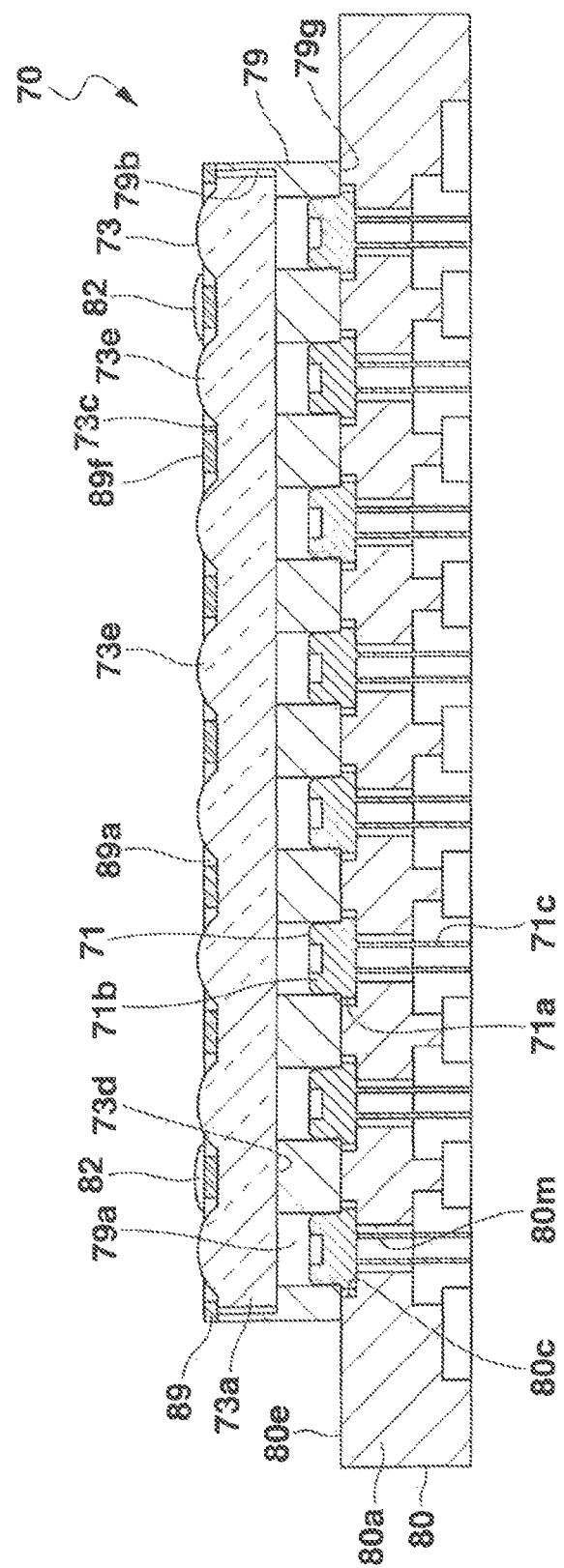
FIG. 9 is a sectional view taken along the line I-I which indicates where light source elements are positioned in the light source device shown in FIG. 6.
Figure 10:
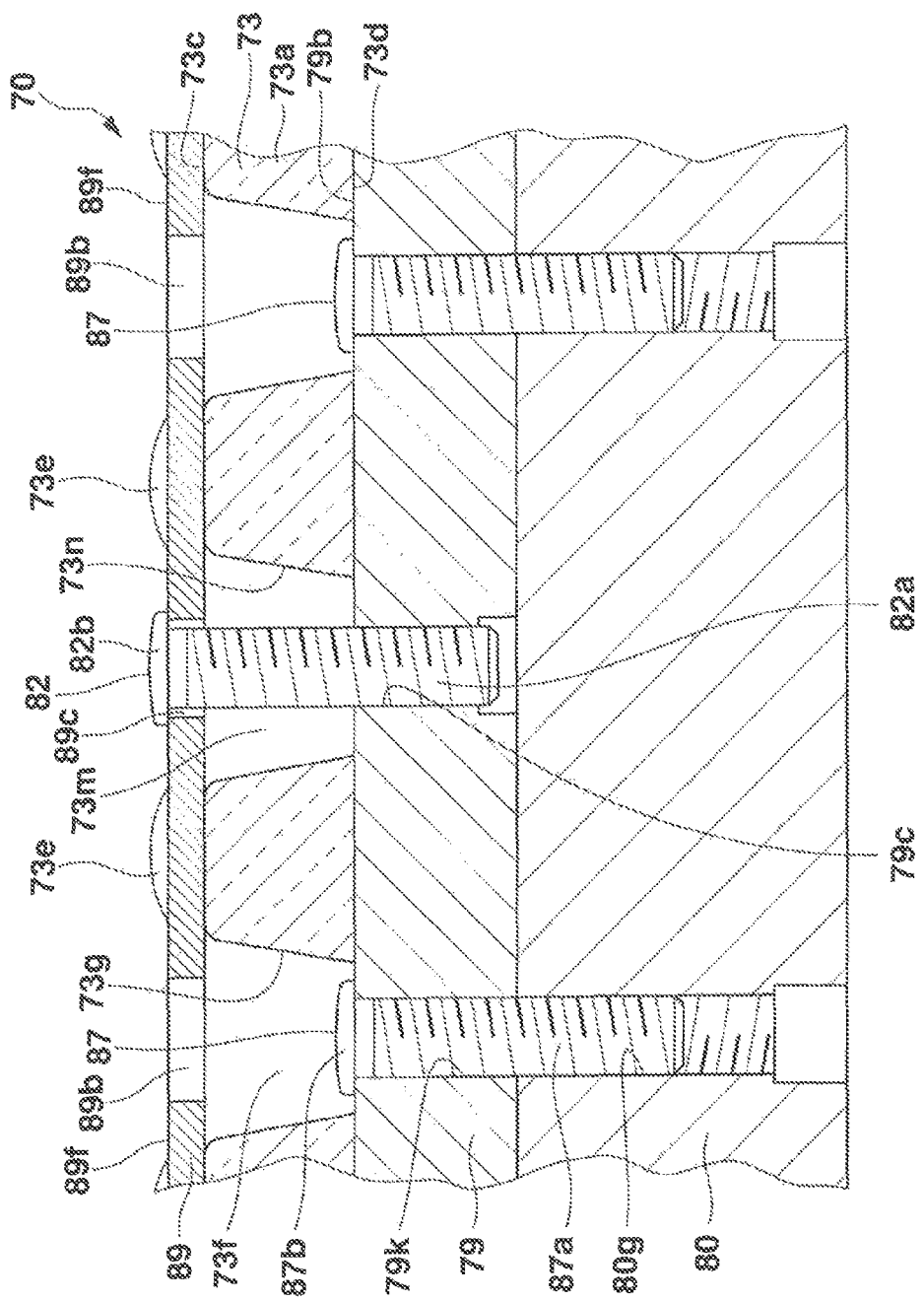
FIG. 10 is a partially enlarged sectional view taken along the line II-II which indicates where screws are positioned in the light source device shown in FIG. 6.

Next, the excitation light shining device 70, which is the light source device of the projector 10, will be described. FIG. 4 is a perspective view of the excitation light shining device 70 according to the embodiment of the invention. FIG. 5 is an exploded perspective view of the excitation light shining device 70 shown in FIG. 4. FIG. 6 is a front view of the excitation light shining device 70. FIG. 7 is an explanatory drawing of a screw disposition area of the excitation light shining device 70. FIG. 8 is a perspective view of a lens array 73 of the excitation light shining device 70. FIG. 9 is a sectional view taken along the line I-I which indicates where the light source elements of the excitation light shining device 70 shown in FIG. 6 are positioned. FIG. 10 is a partially enlarged sectional view taken along the line II-II which indicates where screws are positioned in the light source device shown in FIG. 6.

Firstly, the excitation light shining device 70 will be described briefly. The excitation light shining device 70 has a lens array 73, an array holding member 79, a light source holding member 80, a heat sink 81, a fastening plate 89, lens fixing screws 82 which are first fixing screw members and a holder fixing screws 87 which are second fixing screw members.

In the excitation light shining device 70, the fastening plate 89, the lens array 73, the array holding member 79 and the light source holding member 80 are disposed sequentially in that order from the front to the rear thereof, and these constituent members are fastened together by the fixing screws 82, 87 and the like.

To describe this in detail, the lens fixing screws 82 are, as will be described later, inserted through lens fixing screw holes 89c which are second hole portions of the fastening plate 89 and lens fixing screw holes 73m which are first hole portions of the lens array 73 and are then inserted into lens fixing screw threaded holes 79c which are first threaded portions of the array holding member 79 to thereby fasten the fastening plate 89, the lens array 73 and the array holding member 79 together (refer to FIG. 10).

As will be described later, the holder fixing screws 87 are inserted through holder fixing screw holes 79k which are fourth hole portions of the array holding member 79 and are then inserted into a holder fixing screw threaded holes 80g which are second threaded holes of the light source holding member 80 to thereby fasten the array holding member 79 and the light source holding member 80 together (refer to FIG. 10). In addition, holder fixing screw holes 89b which are fifth hole portions of the fastening plate 89 and holder fixing screw holes 73f which are third hole portions of the lens array 73 are formed in front of the holder fixing screw holes 79k of the array holding member 79 for adjusting the holder fixing screws 87.

Next, the constituent members of the excitation light shining device 70 will be described in detail. As shown in FIGS. 4 and 5, the excitation light shining device 70 has the array holding member 79 and the light source holding member 80 which are each formed into a substantially rectangular parallelepiped. Then, the excitation light shining device 70 has also such a construction as that laser diodes or light emitting diodes (LEDs) which are light source elements functioning as the excitation light sources 71 are held between the array holding member 79 and the light source holding member 80.

The light source holding member 80 has a plate-shaped main body portion 80a and a projecting portion 80b and is formed into an L-shape in section. A plurality of laser diodes which are light source elements functioning as the excitation light sources 71 are arranged into a matrix fashion in the plate-shaped main body portion 80a. The heat sink 81 is attached to a rear of the light source holding member 80 for absorbing and dissipating heat from the light source holding member 80 with heat sink fixing screws 83. A flexible circuit board (not shown) which is electrically connected to the excitation light sources 71 is provided on a bottom side of the excitation light shining device 70.

The lens array 73, which functions as an optical element which collects light emitted from the plurality of excitation light sources 71, is provided on a front side of the light source holding member 80. A plurality of convex lens portions 73e are formed on the lens array 73 in positions which correspond individually to the plurality of excitation light sources 71.

The array holding member 79, which holds the lens array 73, is provided between the lens array 73 and the light source holding member 80. The array holding member 79 is made of a metallic material having a high heat dissipating performance and is formed into the shape of a substantially rectangular plate. The array holding member 79 has a substantially rectangular mounting depressed portion 79b which is formed at a central portion on a front surface thereof so that the lens array 73 is mounted therein. In this embodiment, heat conducted to the array holding member 79 is dissipated into the air from side surfaces of the array holding member 79. Additionally, light passage holes 79a are formed in the mounting depressed portion 79b of the array holding member 79 in positions which correspond individually to optical paths of light emitted from the plurality of excitation light sources 71. The light passage holes 79a are arranged into a matrix fashion.

The fastening plate 89 is disposed on a front surface side of the array holding member 79 and the lens array 73 for pressing the lens array 73 against the array holding member 79. In the fastening plate 89, a plurality of lens holes 89a which are large-diameter light shining hole portions are formed in a plate-shaped main body portion 89f in positions which correspond to the convex lens portions 73e of the lens array 73. Additionally, the fastening plate 89 has the plurality of lens fixing screw holes 89c having a small diameter through which the lens fixing screws 82 which are the first fixing screw members are inserted and the plurality of holder fixing screw holes 89b having a large diameter through which the holder fixing screws 87 which are the second fixing screw members are inserted.

Next, referring to FIGS. 6 and 7, a construction will be described in which the screws 87, 82 of the excitation light shining device 70 are disposed. As has been described above, in the fastening plate 89, the lens portions 73e of the lens array 73 are disposed in the positions where the lens holes 89a which are the light shining hole portions are formed.

Referring to FIG. 7, in the excitation light shining device 70 of the embodiment, the holder fixing screw 87, the holder fixing screw 87, the lens fixing screw 82, the holder fixing screw 87, the lens fixing screw 82, the holder fixing screw 87 and the holder fixing screw 87 are disposed at predetermined intervals sequentially in that order from the left to the right in each of areas A, B which are defined individually between three rows of lens portions 73e. Further, the lens fixing screws 82 are disposed at predetermined intervals in positions which are situated at edge portions of an area where the fastening plate 89 is placed and in proximity to the holder fixing screws 87 disposed at both end portions of the excitation light shining device 70. Additionally, the holder fixing screw holes 89b and the lens fixing screw holes 89c are formed in the fastening plate 89 so as to correspond to the holder fixing screws 87 and the lens fixing screws 82, respectively. Namely, in the excitation light shining device 70 of the embodiment, the plurality of lens fixing screws 82 are disposed in proximity to the central portion and in proximity to the corner portions of the excitation light shining device 70. In addition, the plurality of holder fixing screws 87 are disposed over the wide area on the surface of the excitation light shining device 70.

Additionally, in the excitation light shining device 70 of the embodiment, the fixing screw hole portions are formed in the lens array 73, the array holding member 79 and the light source holding member 80 respectively so that the pluralities of holder fixing screws 87 and lens fixing screws 82 are disposed in the ways described above. Then, the fastening plate 89, the lens array 73, the array holding member 79 and the light source holding member 80 are configured so as to be integrally fastened together with the holder fixing screws 87 and the lens fixing screws 82.

In addition, in the excitation light shining device 70 of the embodiment, holes 80p are formed in positions which are situated in proximity to each of corner portions of the plate-shaped main body portion 80a of the light source holding member 80. Heat sink fixing screws 83 are inserted through the holes 80p, so that the heat sink 81 and the light source holding member 80 are configured so as to be fastened together.

Next, referring to FIG. 8, the lens array 73 will be described in detail. The lens array 73 has a plate-shaped base portion 73a and the plurality of convex lens portions 73e. Transparent materials can be adopted as a material from which the lens array 73 is formed. For example, an optical glass such as a white plate glass or silica glass can be adopted. Additionally, a acryl-based, polyester-based, styrene-based, epoxy-based, polycarbonate-based, or vinyl chloride-based resin can also be adopted. A molding resin material is used as a material from which the lens array 73 is formed, and the lens array 73 is formed through molding.

The plate-shaped base portion 73a is a plate member having a substantially rectangular shape. The convex lens portions 73e are formed integrally on a flat surface 73c on a front side, and formed on a rear side is a flat surface 73d (refer to FIG. 9) which faces the array holding member 79 and which is brought into abutment with the array holding member 79.

The plurality of lens portions 73e are arranged into a matrix fashion at predetermined intervals so as to be aligned individually with the light source elements which are the excitation light sources 71 within an area on the front flat surface 73c of the plate-shaped base portion 73a which lies by a predetermined dimension inwards from a circumferential edge portion of the plate-shaped base portion 73a. In this embodiment, a total of 24 lens portions 73e is formed in three rows and eight columns.

In the lens array, 73, screw holes are formed in the plate-shaped base portion 73a. Formed as the screw holes are the plurality of lens fixing screw holes 73m through which the lens fixing screws 82 are inserted and a plurality of holder fixing screw holes 73f through which the holder fixing screws 87 are inserted. To describe this in detail, the holder fixing screw holes 73f and the lens fixing screw holes 73m are formed individually in central portions of areas which are each defined by four lens portions 73e.

The holder fixing screw holes 73f which are formed in the lens array 73 are holes having a large diameter through which the holder fixing screws 87 which are the second fixing screw members are inserted. The holder fixing screw holes 73f are formed slightly larger in diameter than a head portion of the holder fixing screw 87. The holder fixing screw hole 73f is formed so that a front opening diameter is larger than a rear opening diameter, and a sloping surface portion 73g is formed on inner surface of the holder fixing screw hole 73f.

The lens fixing screw holes 73m which are the first hole portions are holes having a small diameter through which the lens fixing screws 82 which are the first fixing screw members are inserted. The lens fixing screw holes 73m are formed slightly larger in diameter than the main body portion 82a of the lens fixing screw 82 and are formed smaller in diameter than the holder fixing screw hole 73f. The lens fixing screw hole 73m is formed so that a front opening diameter is larger than a rear opening diameter, and a sloping surface portion 73n is formed on inner surface of the lens fixing screw hole 73m.

Next, the constituent members of the excitation light shining device 70 will be described in detail by reference to the sectional view of FIG. 9. The excitation light source 71 has a circular disk-shaped base 71a on which a light emitting portion is placed and a cylindrical cover portion 71b which accommodates the light emitting portion and in which an opening portion is formed through which light emitted by the light emitting portion is allowed to travel to the front. A lead terminal portion 71c which is electrically connected to the light emitting portion is provided in the base 71a.

The light source holding member 80 is formed of a heat dissipating member that is made of a metallic material or an alloy material such as aluminum or copper. A flat surface 80e is formed on a front surface of the plate-shaped main body portion 80a so as to face the array holding member 79. Pluralities of mounting depressed portions 80c and through holes 80m are formed at predetermined intervals in the flat surface 80e, and the excitation light source 71 is mounted in each mounting depressed portion 80c.

The base 71a is formed of a metallic material having good heat conductivity such as aluminum or the like and works to dissipate heat generated by the light emitting portion. Additionally, the base 71a has a larger diameter than that of the cover portion 71b and is disposed on the light source holding member 80 so that a flat surface formed on a side facing the light source holding member 80 adheres to the mounting depressed portion 80c on the light source holding member 80. A flat surface is formed on a front side of an outer circumferential portion of the base 71a, so that this front flat surface is pressed towards the light source holding member 80 by a circumferential portion of the light passage hole 79a in the array holding member 79.

A terminal portion (not shown) is mounted on the lead terminal portion 71c of the excitation light source 71 which is disposed in the mounting depressed portion 80c, whereby the excitation light source 71 is electrically connected to the flexible circuit board via the terminal portion. The flexible circuit board is then electrically connected to the light source control circuit 41, the control unit 38 or the like.

The substantially rectangular plate-shaped array holding member 79 is disposed on the front side of the light source holding member 80. A flat surface 79g is formed on a rear end face of the array holding member 79 and is disposed so that the flat surface 80e of the light source holding member 80 adheres to the flat surface 79g. The mounting depressed portion 79b is formed on the front side of the array holding member 79 so that the lens array 73 is mounted therein. The rear flat surface 73d of the plate-shaped base portion 73a of the lens array 73 is disposed so as to adhere to a flat surface of the mounting depressed portion 79b. Additionally, the plurality of light passage holes 79a are formed in the flat surface of the mounting depressed portion 79b. These light passage holes 79a each function as an optical path of light which is emitted from the excitation light source 71 towards the lens portion 73e of the lens array 73.

As has been described above, the plurality of lens portions 73e are formed on the front side of the plate-shaped base portion 73a of the lens array 73 which is mounted in the mounting depressed portion 79b so as to project slightly from the lens holes 89a which are the light shining hole portions in the fastening plate 89. The front flat surface 73c of the lens array 73 adheres to the rear flat surface of the plate-shaped main body portion 89f of the fastening plate 89.

Next, a fastening construction realized by the screws 82, 87 of the excitation light shining device 70 will be described by reference to FIG. 10. As shown in FIG. 10, the lens fixing screw threaded holes 79c are formed in the array holding member 79 in the positions which correspond to the lens fixing screw holes 73m in the lens array 73 as has been described above. Then, an external screw thread on the main body portion 82a of the lens fixing screw 82 is brought into engagement with the lens fixing screw threaded hole 79c.

The lens fixing screw holes 89c are formed in the plate-shaped main body portion 89f of the fastening plate 89 so that the main body portions 82a of the lens fixing screws 82 are allowed pass therethrough. These lens fixing screw holes 89c are each formed smaller in diameter than the head portion 82b of the lens fixing screw 82. Because of this, the head portion 82b of the lens fixing screw 82 is locked on the lens fixing screw hole 89c in the fastening plate 89, while the main body portion 82a of the lens fixing screw 82 is brought into engagement with the lens fixing screw threaded hole 79c in the array holding member 79.

In this embodiment, the lens fixing screw holes 89c in the fastening plate 89 are each formed smaller in diameter than the front opening diameter of the lens fixing screw hole 73m in the lens array 73, and a circumferential portion of the lens fixing screw hole 89c in the fastening plate 89 has elasticity.

To describe this in detail, the head portions 82b of the lens fixing screws 82 press the circumferential portion of the lens fixing screw holes 89c in the fastening plate 89 towards the array holding member 79, whereby the front flat surface 73c of the lens array 73 is pressed towards the array holding member 79 by the rear surface of the plate-shaped main body portion 89f of the fastening plate 89. As this occurs, in the event that the lens fixing screw 82 is tightened with a force larger than a specified tightening force, the head portion 82b of the lens fixing screw 82 presses the circumferential portion of the lens fixing screw hole 89c towards the array holding member 79, and then, the circumferential portion of the lens fixing screw hole 89c is deflected, whereby stress is prevented from being generated locally only on the circumference of the lens fixing screw hole 73m in the lens array 73, thereby making it possible to prevent the breakage of the lens array 73.

In an excitation light shining device of a comparison example which has a construction in which the diameter of lens fixing screw holes 89c in a fastening plate 89 are the same as the diameter of lens fixing screw holes 73m in a lens array 73, for example, in the event that a lens fixing screw 82 is tightened with a force larger than a specified tightening force, large stress is generated locally on the circumference of the lens fixing screw hole 73m, resulting in fears that the lens array 73 is broken. However, the excitation light shining device 70 according to the invention has the construction that has been described above, and therefore, the lens array 73 can be prevented from being broken.

Additionally, as has been described above, in the lens fixing screw hole 73m of the lens array 73, the rear opening diameter is formed smaller than the front opening diameter, and the area of the rear flat surface 73d of the lens array 73 is larger than the area of the front flat surface 73c thereof. Therefore, it is possible to provide a high heat dissipating performance from the lens array 73 to the array holding member 79.

The array holding member 79 has the holder fixing screw holes 79k which are formed in the positions which correspond to the holder fixing screw holes 73f in the lens array 73. The diameter of the holder fixing screw hole 79k is smaller than that of the head portion 87b of the holder fixing screw 87 and is substantially equal to that of the main body portion 87a. The holder fixing screw threaded holes 80g are formed in the light source holding member 80 as internal screw threads, so that external screw threads formed on the main body portions 87a of the holder fixing screws 87 are brought into engagement with the holder fixing screw threaded holes 80g so formed.

In the excitation light shining device 70 that is configured as has been described heretofore, the main body portions 87a of the holder fixing screws 87 are brought into engagement with the holder fixing screw threaded hole 80g in the light source holding member 80 in such a state that the main body portions 87a of the holder fixing screws 87 pass through the holder fixing screw holes 79k in the array holding member 79. The head portions 87b of the holder fixing screws 87 pass through the holder fixing screw holes 89b in the fastening plate 89 and the holder fixing screw holes 73f in the lens array 73 and are then locked on the holder fixing screw holes 79k in the array holding member 79. Because of this, the array holding member 79 and the light source holding member 80 can be fastened together strongly and rigidly with the holder fixing screws 87 in such a state that the array holding member 79 and the light source holding member 80 adhere to each other.

Incidentally, the light emission efficiency of the excitation light source 71 is decreased when the temperature of the excitation light source 71 is increased. Consequently, the light source holding member 80 is formed of a heat dissipating material in order to dissipate heat from the excitation light sources 71. Then, in this embodiment, as has been described above, since the array holding member 79 and the light source holding member 80 can be fastened together strongly and rigidly with the holder fixing screws 87 in such a state that both the members adhere to each other, heat conducted to the light source holding member 80 from the excitation light sources 71 can also be dissipated via the array holding member 79 which is disposed on the front side of the light source holding member 80 and which has the high heat dissipating performance, thereby making it possible to suppress the increase in temperature of the excitation light sources 71 more effectively than when the heat is dissipated only by the light source holding member 80.

Additionally, as has been described above, in the lens array 73, the holder fixing screw holes 73f are formed in the plate-shaped base portion 73a, and in the fastening plate 89, the holder fixing screw holes 89b are formed in the positions which correspond individually to the holder fixing screw holes 73f. These holder fixing screw holes 73f, 89b are formed larger in diameter than that of the head portions 87b of the holder fixing screws 87, whereby those fixing screw holes 73f, 89b can also be used as adjusting holes for adjusting the holder fixing screws 87.

Figure 11A:
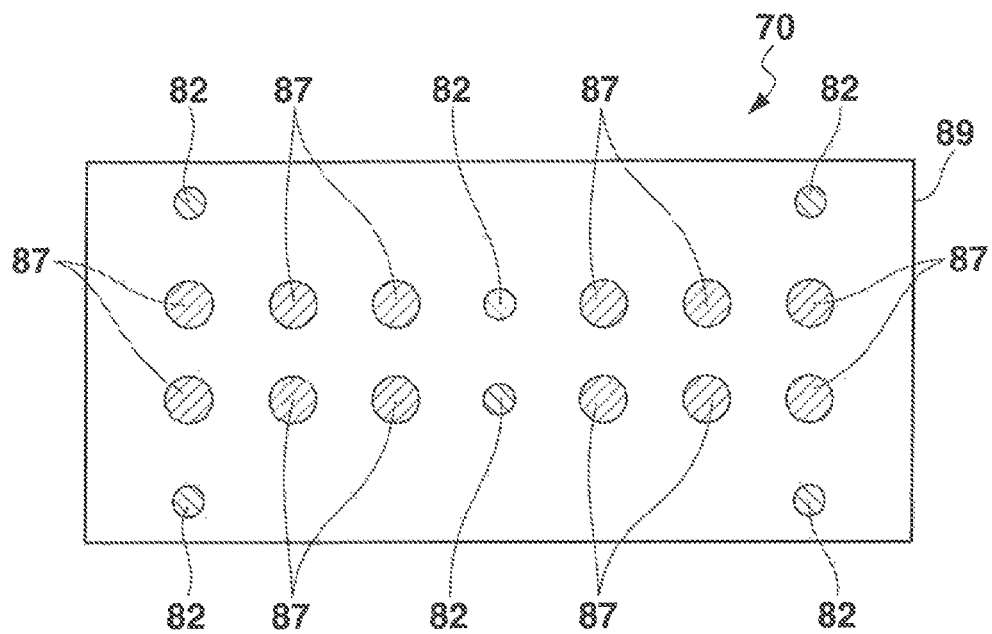
FIG. 11A is an exemplary front view of a light source device according to a first modified example of the embodiment of the invention.

The positions where the plurality of lens fixing screws 82 which are the first fixing screw members and the holder fixing screws 87 which are the second fixing screw members are located are not limited to those described in the embodiment, and hence, the positions may be changed as required. For example, as shown in a first modified example shown in FIG. 11A, the lens fixing screws 82 may be disposed in central positions and positions lying in proximity to four corners.

Figure 11B:
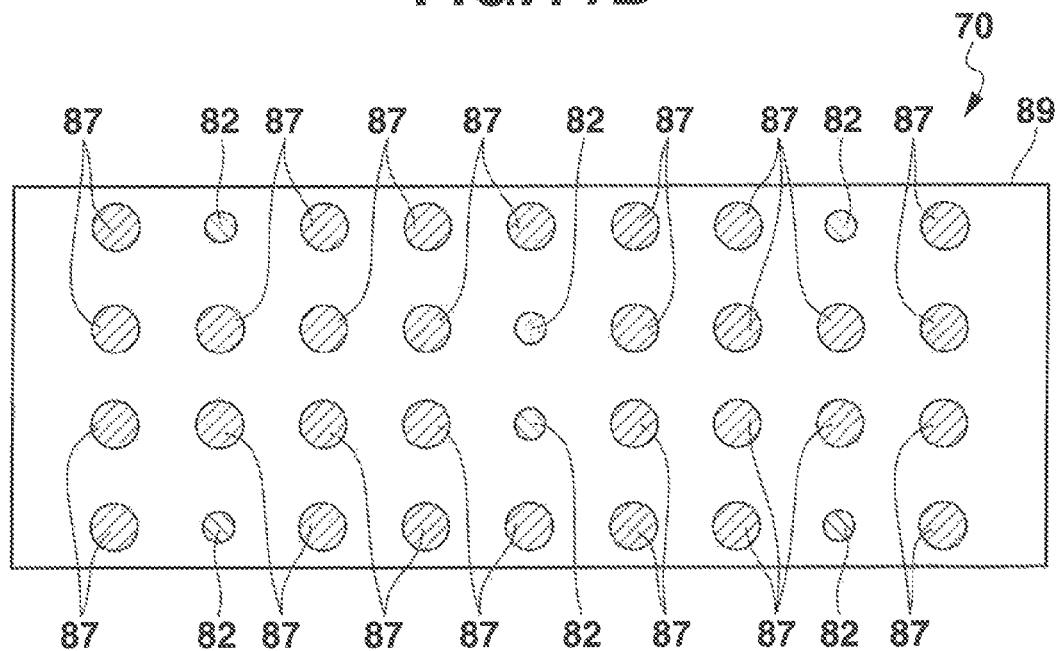
FIG. 11B is an exemplary front view of a light source device according to a second modified example of the embodiment of the invention.

In addition, for example, as shown in a second modified example shown in FIG. 11B, areas where the holder fixing screws 87 are disposed are provided in proximity to both left and right end portions of the excitation light shining device 70, so that a plurality of holder fixing screws 87 may additionally be disposed in those areas so as to be aligned along end edges of the excitation light shining device 70. By so doing, the adhesion of the array holding member 79 and the light source holding member 80 to each other is increased further, the heat dissipating performance of the light source holding member 80 being thereby increased.

Thus, as has been described heretofore, according to the embodiment of the invention, in the excitation light shining device 70 as the light source device, in the lens array 73, the plurality of lens fixing screw holes 73m which are the first hole portions are formed in the plate-shaped base portion 73a, and in the array holding member 79, the lens fixing screw threaded holes 79c which are the first threaded hole portions are formed in the positions which correspond individually to the lens fixing screw holes 73m. Then, by passing the main body portions 82a of the lens fixing screws 82 through the lens fixing screw holes 73m to be brought into engagement with the lens fixing screw threaded holes 79c, it is configured so that the lens array 73 and the array holding member 79 are disposed in such a state that the lens array 73 and the array holding member 79 adhere to each other. Because of this, it is possible to provide the light source device which is the excitation light shining device 70 in which the adhesion of the lens array 73 to the array holding member 79 is increased so high as to provide the high heat dissipating performance and the projector 10 which includes the light source device.

Additionally, to describe this in detail, it is configured so that the lens array 73 and the array holding member 79 are disposed in such a state that the rear flat surface 73d of the plate-shaped base portion 73a of the lens array 73 and the front flat surface of the mounting depressed portion 79b of the array holding member 79 adhere to each other, thereby making it possible to increase the heat dissipating performance of the array holding member 79 relative to the lens array 73.

In addition, according to the embodiment of the invention, the fastening plate 89 which is disposed on the light shining side of the lens array 73 has the plate-shaped main body portion 89f, the plurality of lens holes 89a which are formed in the plate-shaped main body portion 89f in the positions which correspond individually to the plurality of lens portions 73e and the lens fixing screw holes 89c which are formed in the plate-shaped main body portion 89f so as to allow the main body portions 82a of the lens fixing screws 82 to pass therethrough and which are the second hole portions which are formed smaller in diameter than that of the head portions 82b of the lens fixing screws 82. Then, the lens fixing screws 82 pass through the lens fixing screw holes 89c in the fastening plate 89 and the lens fixing screw holes 73m in the lens array 73 so as to be brought into engagement with the lens fixing screw threaded holes 79c in the array holding member 79. Namely, the fastening plate 89 pushes the lens array 73 towards the array holding member 79, whereby the adhesion of the lens array 73 to the array holding member 79 is increased further to thereby increase further the heat dissipating performance of the array holding member 79 relative to the lens array 73.

Further, according to the embodiment of the invention, in the plurality of lens fixing screw holes 73m in the lens array 73, the front opening diameter is made larger than that of the lens fixing screw holes 89c in the fastening plate 89, and the circumferential portions of the lens fixing screw holes 89c in the fastening plate 89 function as springs having elasticity in the front-to-rear direction. Then, by pressing the circumferential portions of the lens fixing screw holes 89c in the fastening plate 89 towards the array holding member 79 by the head portions 82b of the lens fixing screws 82, the plate-shaped base portion 73a of the lens array 73 is pressed against by the plate-shaped main body portion 89f of the fastening plate 89. By so doing, the lens array 73 can be pushed against the array holding member 79 by the fastening plate 89 evenly over the surface thereof, whereby the adhesion of the lens array 73 to the array holding member 79 is increased further. Additionally, the circumferential portions of the lens fixing screw holes 89c in the fastening plate 89 function as the springs having the elasticity in the front-to-rear direction, and therefore, the breakage of the lens array 73 can be prevented.

In addition, according to the embodiment of the invention, in the lens fixing screw holes 73m in the lens array 73 through which the lens fixing screws 82 are passed, the front opening diameter is formed larger than the rear opening diameter, and the sloping surface portion 73n is formed on the inner surface of the lens fixing screw hole 73m. Therefore, the area of the rear flat surface 73d becomes larger than the area of the front flat surface 73c, whereby the adhesion of the lens array 73 to the array holding member 79 is increased to thereby increase the heat dissipating performance from the lens array 73 to the array holding member 79.

Further, according to the embodiment of the invention, in the lens array 73, the holder fixing screw holes 73f which are the third hole portions are formed in the plate-shaped base portion 73a, and the array holding member 79 has the holder fixing screw holes 79k which are the fourth hole portions and are formed in the positions which correspond individually to the holder fixing screw holes 73f in the lens array 73. Additionally, the light source holding member 80 has the holder fixing screw threaded holes 80g which are the second threaded hole portions. Then, the main body portions 87a of the holder fixing screws 87 pass through the holder fixing screw holes 79k in the array holding member 79 to thereby be brought into engagement with the holder fixing screw threaded holes 80g in the light source holding member 80. Because of this, the adhesion of the lens array 73 to the light source holding member 80 is increased to thereby increase the heat dissipating performance from the array holding member 79 to the light source holding member 80.

Additionally, according to the embodiment of the invention, the holder fixing screw holes 89b are formed in the fastening plate 89, and the holder fixing screw holes 73f are formed in the lens array 73. Because of this, the respective holes 89b, 73f can be used as the adjusting hole portions for the holder fixing screws 87. In addition, the formation of the respective holes 89b, 73f increases the heat dissipating performance.

Further, according to the embodiment of the invention, the adhesion of the lens array 73, the array holding member 79 and the light source holding member 80 to one another is so high that the distance between the light source elements which are excitation light sources 71 and the lens array 73 can be made short, thereby making it possible to reduce the size of the lens portions 73e of the lens array 73. Namely, light emitted from the excitation light sources 71 is allowed to be incident on the lens portions 73e of the lens array 73 before the light is diffused largely, and therefore, the lens array 73 can be made small in size. In other words, the excitation light shining device 70 can be made small in size.

In addition, according to the embodiment of the invention, the lens fixing screw holes 89c in the fastening plate 89, the lens fixing screw holes 73m in the lens array 73 and the lens fixing screw threaded holes 79c in the lens array holding member 79 through and into which the plurality of lens fixing screws 82 are inserted are respectively formed so that the plurality of lens fixing screws 82 are disposed in the proximity to the central portion and the corner portions within the flat surface of the plate-shaped base portion 73a of the lens array 73. Because of this, the adhesion of the lens array 73 to the array holding member 79 is increased, thereby making it possible to increase the heat dissipating performance of the array holding member 79 relative to the lens array 73.

Further, according to the embodiment of the invention, the fastening force with which the array holding member 79 and the light source holding member 80 are fastened together by the holder fixing screws 87 can be made stronger than the fastening force with which the lens array 73 and the array holding member 79 are fastened together by the lens fixing screws 82, whereby the adhesion of the array holding member 79 to the light source holding member 80 is increased, thereby making it possible to prevent the breakage of the lens array 73.

In addition, according to the embodiment of the invention, it is preferable that the number of holder fixing screws 87 is larger than the number of lens fixing screws 82 and that the holder fixing screws 87 are disposed over a wider range than a range over which the lens fixing screws 82 are disposed. By so doing, the adhesion of the array holding member 79 to the light source holding member 80 is increased further, and hence, the array holding member 79 is allowed to have the high heat dissipating performance of dissipating heat from the light source holding member 80.

Further, according to the embodiment of the invention, the array holding member 79 is the member which is formed of the high heat conductive material, the array holding member 79 is allowed to have the high teat dissipating performance of dissipating heat from the lens array 73.

Additionally, according to the embodiment of the invention, the light source holding member 80 has the heat sink 81 which is in abutment with the light source holding member 80 on the surface thereof which is opposite to the surface on which the excitation light sources 71 which are the light source elements are held, and therefore, the light source holding member 80 is allowed to have the high heat dissipating performance.

Further, according to the embodiment of the invention, the excitation light sources 71 which are the light source elements are made up of the light emitting diodes or laser diodes, and therefore, the excitation light shining device 70 which is the light source device is allowed to emit highly bright light.

In addition, according to the embodiment of the invention, the projector 10 includes the excitation light shining device 70 which is the light source device, the display element 51 which forms optical images with light emitted by the light source device, the projection side optical system 220 which projects the optical images formed by the display element 51 onto the screen, and the control unit 38 which is the projector control unit which controls the light source device and the display element 51. Therefore, the projector having the aforesaid advantages can be provided.

Additionally, according to the embodiment of the invention, the lens array 73 is adopted in place of a plurality of collimator lenses, and therefore, the production costs of the excitation light shining device 70 can be reduced.

In addition, according to the embodiment of the invention, the necessity of adjusting individually the positions of a plurality of collimator lenses is obviated, and the lens array 73 is used in which the plurality of lens portions 73e are formed in the predetermined positions with high accuracy, whereby a reduction in production costs and production time of the excitation light shining device 70 can be realized.

Additional advantages and modifications will readily occur to those skilled in the art. Therefore, the invention in its broader aspects is not limited to the specific details and representative embodiment including the modifications shown and described herein. Accordingly, various modifications may be made without departing from the spirit and scope of the general inventive concept as defined by the appended claims and their equivalents.

What is claimed is:

1. A light source device comprising:
    a light source holding member in which a plurality of light source elements are arranged in a matrix fashion at predetermined intervals;
    a lens array which has a plate-shaped base portion and a plurality of convex lens portions which are arranged in a matrix fashion at predetermined intervals so as to correspond individually to the plurality of light source elements, wherein the plurality of convex lens portions are formed integrally with the plate-shaped base portion, and the lens array is disposed on a light shining side of the light source elements; and
    an array holding member which is disposed between the light source holding member and the lens array to hold the lens array;
    wherein the lens array has a plurality of first hole portions in the plate-shaped base portion through which first fixing screw members are inserted;
    wherein the array holding member has a plurality of first threaded hole portions with which the first fixing screw members are brought into engagement, in positions which correspond to the plurality of first hole portions in the lens array; and
    wherein the first fixing screw members pass through the first hole portions in the lens array and are brought into engagement with the first threaded hole portions in the array holding member such that the lens array and the array holding member are disposed to adhere to each other.

2. A light source device as set forth in claim 1, wherein a flat surface on a rear side of the plate-shaped base portion of the lens array and a flat surface on a front side of the array holding member are disposed to adhere to each other.

3. A light source device as set forth in claim 1, further comprising:
    a fastening plate which is disposed on a light shining side of the lens array;
    wherein the fastening plate has a plate-shaped main body portion, a plurality of light shining hole portions which are formed in positions which correspond to the plurality of lens portions of the lens array, and second hole portions through which main body portions of the first fixing screw members pass and which are smaller in diameter than head portions of the first fixing screw members; and
    wherein the first fixing screw members pass through the second hole portions in the fastening plate and the first hole portions in the lens array and are brought into engagement with the first threaded hole portions in the array holding member such that the fastening plate and the lens array are disposed to adhere to each other.

4. A light source device as set forth in claim 3, wherein the plurality of first hole portions in the lens array through which the first fixing screw members are inserted are formed so that a front opening diameter thereof is larger than that of the second hole portions in the fastening plate through which the first fixing screw members are inserted; and
    wherein circumferential portions of the second hole portions in the fastening plate are pressed towards the array holding member by the head portions of the first fixing screw members so as to press the plate-shaped base portion of the lens array by the plate-shaped main body portion of the fastening plate.

5. A light source device as set forth in claim 4, wherein the plurality of first hole portions in the lens array through which the first fixing screw members are inserted are formed so that the front opening diameter thereof is larger than a rear opening diameter thereof and so that a sloping surface portion is formed on an inner surface of each of the plurality of first hole portions.

6. A light source device as set forth in claim 1, wherein the lens array has second hole portions in the plate-shaped base portion through which second fixing screw members are inserted;
  wherein the array holding member has third hole portions through which main body portions of the second fixing screw members are inserted, in positions which correspond to the seconds hole portions in the lens array;
  wherein the light source holding member has second threaded hole portions into which the second fixing screw members are inserted; and
  wherein the main body portions of the second fixing screw members are inserted through the third hole portions in the array holding member and are brought into engagement with the second threaded hole portions in the light source holding member such that the light source holding member and the array holding member are disposed to adhere to each other.

7. A light source device as set forth in claim 3, wherein the lens array has third hole portions in the plate-shaped base portion through which second fixing screw members are inserted;
  wherein the array holding member has fourth hole portions through which main body portions of the second fixing screw members are inserted, in positions which correspond to the third hole portions in the lens array;
  wherein the light source holding member has second threaded hole portions into which the second fixing screw members are inserted; and
  wherein the main body portions of the second fixing screw members are inserted through the fourth hole portions in the array holding member and are brought into engagement with the second threaded hole portions in the light source holding member such that the light source holding member and the array holding member are disposed to adhere to each other.

8. A light source device as set forth in claim 3, wherein the second hole portions in the fastening plate, the first hole portions in the lens array and the first threaded hole portions in the array holding member through and into which the plurality of first fixing screw members are inserted are formed so that the plurality of first fixing screw members are disposed in proximity to a central portion and corner portions within a flat surface of the plate-shaped base portion of the lens array.

9. A light source device as set forth in claim 6, wherein a fastening force with which the array holding member and the light source holding member are fastened together by the second fixing screw members is stronger than a fastening force with which the lens array and the array holding member are fastened together by the first fixing screw members.

10. A light source device as set forth in claim 7, wherein a fastening force with which the array holding member and the light source holding member are fastened together by the second fixing screw members is stronger than a fastening force with which the lens array and the array holding member are fastened together by the first fixing screw members.

11. A light source device as set forth in claim 8, wherein a fastening force with which the array holding member and the light source holding member are fastened together is stronger than a fastening force with which the lens array and the array holding member are fastened together by the first fixing screw members.

12. A light source device as set forth in claim 1, wherein the array holding member is formed of a heat conductive material.

13. A light source device as set forth in claim 1, wherein the light source holding member has a heat sink which is brought into abutment with the light source holding member on a surface opposite from a surface on which the light source elements are held.

14. A light source device as set forth in claim 1, wherein the light source elements are light emitting diodes or laser diodes.

15. A projector comprising:
  the light source device as set forth in claim 1;
  a display element which forms an optical image with light emitted by the light source device;
  a projection-side optical system which projects the optical image formed by the display element onto a screen; and
  a projector control unit which controls the light source device and the display element.

16. A projector comprising:
  the light source device as set forth in claim 3;
  a display element which forms an optical image with light emitted by the light source device;
  a projection-side optical system which projects the optical image formed by the display element onto a screen; and
  a projector control unit which controls the light source device and the display element.

* * * * *